United States Patent [19]

Hendrickson

[11] 3,832,685

[45] Aug. 27, 1974

[54] DATA SIGNAL RECOGNITION APPARATUS

[76] Inventor: Alan E. Hendrickson, 8 College Gardens, S.E. 21, London, England

[22] Filed: Mar. 9, 1973

[21] Appl. No.: 339,535

[30] Foreign Application Priority Data

Mar. 10, 1972 Great Britain .................... 11366/72

[52] U.S. Cl. .............................................. 340/146.2

[51] Int. Cl. .............................................. G06f 7/02

[58] Field of Search........... 340/146.2, 146.3, 172.5, 340/206

[56] References Cited

UNITED STATES PATENTS

| | | | |
|---|---|---|---|
| 3,162,857 | 12/1964 | Sanders | 340/206 |
| 3,241,114 | 3/1966 | Zieper et al. | 340/146.2 |
| 3,624,649 | 11/1971 | Ranieri | 340/206 |
| 3,660,823 | 5/1972 | Recks | 340/146.2 |
| 3,686,634 | 8/1972 | Malchman et al. | 340/206 |
| 3,750,108 | 7/1931 | Jensen | 340/172.5 |

*Primary Examiner*—Paul J. Henon
*Assistant Examiner*—Michael Sachs
*Attorney, Agent, or Firm*—Kemon, Palmer & Estabrook

[57] ABSTRACT

In apparatus for recognising data signals in the form of pulse trains, incoming pulse trains are compared with stored data and a recognition signal may be generated not only for an incoming pulse train exactly equivalent to that represented by the stored data but also for incoming pulse trains representing more specific forms of the stored data.

8 Claims, 3 Drawing Figures

PATENTED AUG 27 1974 3,832,685

SHEET 1 OF 2

DATA SIGNAL RECOGNITION APPARATUS

This invention is concerned with apparatus for recognising data signals in the form of pulse trains. In such apparatus, it is usual for recognition signal to be given when an incoming data signal is exactly equivalent to a stored representation of the signal.

The present invention permits the recognition not only of incoming data signals which are exactly equivalent to a stored signal but also of incoming data signals which constitute special cases of a stored signal held in a generalised form, or more specific forms of a particular pattern constituted by a stored general signal.

According to the present invention, apparatus for recognising data signals in the form of pulse trains includes a comparator for comparing the data values of successive signal elements in an incoming pulse train with predetermined values of corresponding elements of a stored signal, and means for generating a recognition signal if each of the data values of the pulse train is not less than (or in alternative forms, does not exceed, is less than or exceeds) the value of the corresponding element of the stored signal.

Thus, for the first mode of operation mentioned, a recognition signal is given when the incoming signal is greater than or is equal to the stored value. For the second possibility, a recognition signal is given if the incoming signal is less than or equal to the stored value. The third and fourth possibilities are the logical complements of the first and second possibilities.

Thus, let it be assumed that there are nine possible values of the first data element of a succession of data elements constituted by a pulse train, that the nine values are represented by the digits 1–9 and that a lower digit represents a generalised form of data represented by a higher digit. Assume recognition for not less than (greater than or equal to) a stored number. Then, if the stored value for this first data element is 5, the apparatus would recognise not only an incoming value of 5 in this first data position in a pulse train but also incoming values of 6, 7, 8 and 9, representing special cases of the data represented by the digit 5.

A signal element may be a characteristic of a pulse in the pulse train or it may be a characteristic of a combination of the pulses, for example the interval between two successive pulses. Although my preferred way of representing data is by choice of time intervals between successive pulses in a pulse train, the invention may also be carried into effect in other ways. For example an incoming signal may have pulse amplitude as a data-representing characteristic, or pulse polarity, or in a further form each pulse may consist of a wave train and a data element may be represented by a suitable selection of the frequency of the wave train within the pulse. To recognise such signals, apparatus embodying the invention will have amplitude-measuring means, or polarity sensing means, or frequency responsive means, according to the signal with which it is to be used.

When the incoming signal is a pulse train in which the data elements are constituted by time intervals between successive pulses, the intervals may be timed by means of a pulse counter and a clock pulse generator, the pulses from the latter being applied to the counter for the duration of the interval between successive pulses in the pulse train. In our preferred form of apparatus, the timing counter also constitutes a comparator; in this form, each stored interval value in turn is extracted from storage and is loaded into the counter and the clock pulses then cause the counter to count down from the loaded value, extracted from store, towards zero. If the counter receives a further clock pulse after reaching its zero condition, the apparatus discontinues its scanning process and is quiescent until the start of the next pulse train. The allocation of data to coded signals is so organised that smaller intervals represent progressively greater generalisations, for example, and in this case the apparatus of the present invention will give a recognition signal not only for a pulse train having a series of intervals identical with those of the stored signal but also for pulse trains representing more specific forms of the particular pattern constituted by the stored general signal.

In order that the invention may be better understood, an example of apparatus embodying the invention, and some diagrams illustrating the operation of the invention, will now be described with reference to the accompanying drawings, in which.

Figure 1:
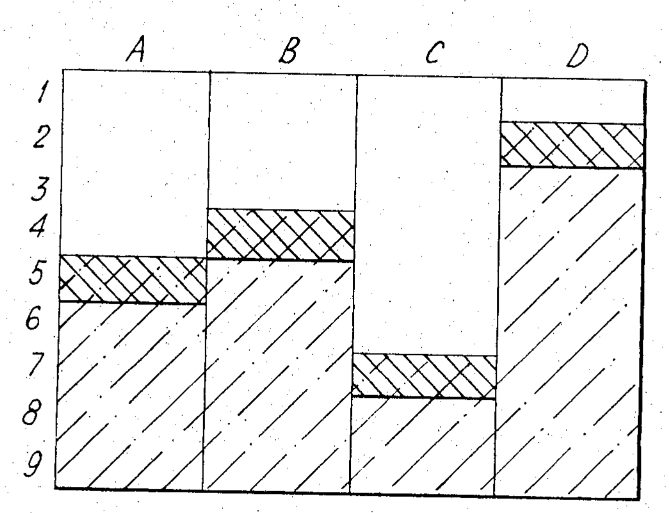
FIG. 1 is a diagram illustrating the operation of apparatus embodying the invention.

In FIG. 1, it is assumed that there are four data elements A, B, C and D, these being four pulse intervals in a train of five pulses. It is also assumed that each interval has nine possible values and that in this example increasing digital values represent progressively more specific forms of the data with which that data element is concerned. If the stored signal is represented by the values 5-4-7-2, then the apparatus will recognise any train of four intervals which falls within the chain-dotted area of FIG. 1.

It will be clear that in an alternative form, the apparatus could respond to intervals which were equal to or less than the stored value, so that the chain-dotted area would occupy those portions of the columns above the shaded sections of FIG. 1 (representing the stored values) as well as the shaded sections.

The other two possible modes of operation are the logical complements of those mentioned above, in a first of which the chain-dotted area in FIG. 1 occupies those portions of the column above the shaded sections, and in the second of which it occupies those portions of the columns below the shaded sections.

Figures 2, 3:
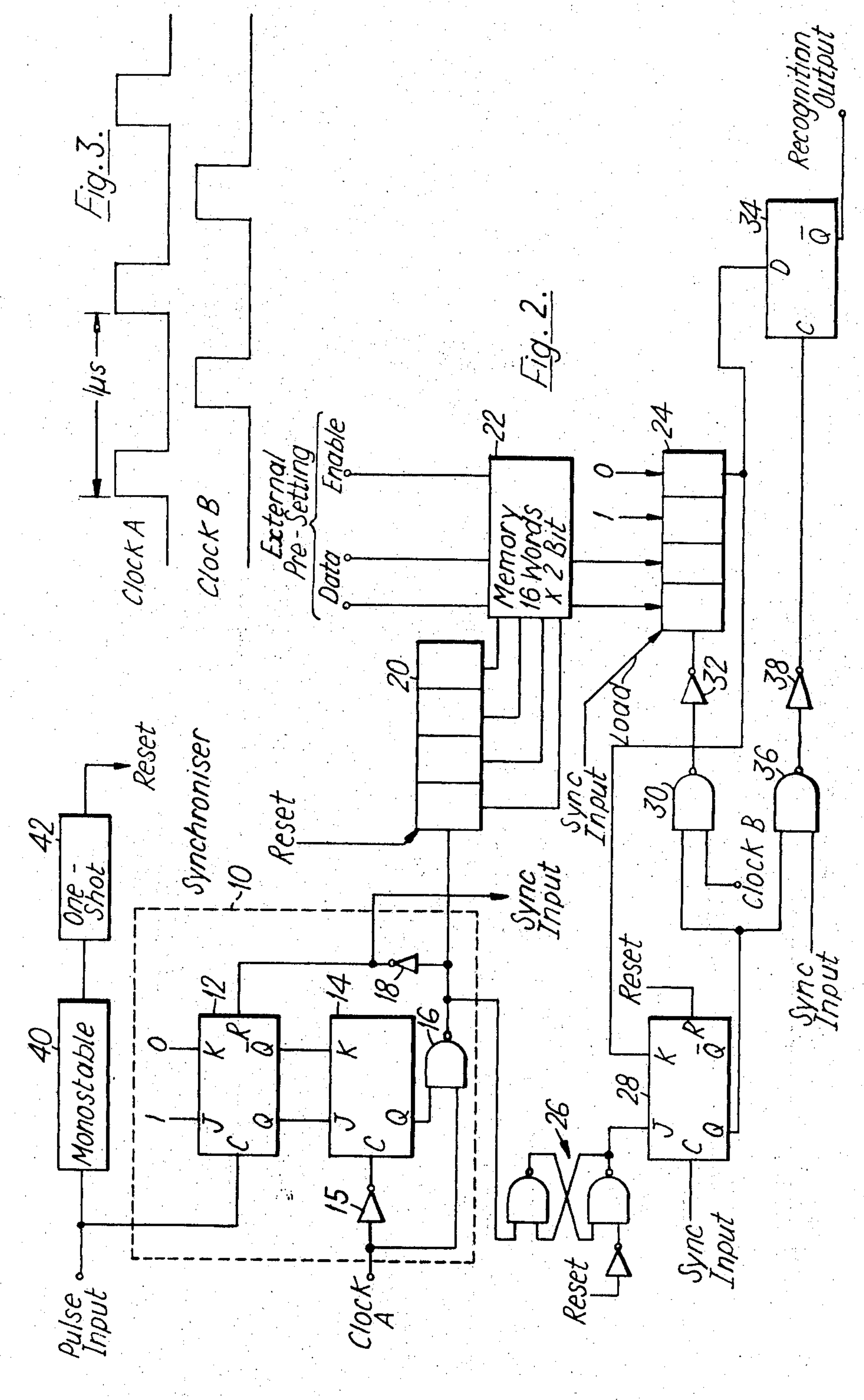
FIG. 2 is a block diagram of apparatus embodying the invention, for recognising data elements in the form of intervals between pulses in a pulse train.
FIG. 3 shows the relationship of the clock pulses used in the operation of the apparatus of FIG. 2.

In the following description of the apparatus shown in FIG. 2, it will be assumed that each incoming pulse train consists of 17 pulses, forming 16 intervals. Each interval can have one of four values, namely, 4, 5, 6 or 7 microseconds. In between pulse trains there is a gap of at least 10 microseconds.

The incoming pulses are applied to a synchroniser unit 10 which includes two JK bistable circuits 12 and 14 inter-connected as shown. As the J input of the bistable 12 is at a permanent "1" level, each pulse of the pulse train causes its Q output to go to the "1" level and to apply this signal level to the J input of the second bistable 14. As a consequence, the next pulse from clock A (acting through an inverter circuit 15) results in "1" level at the Q output of the second JK bistable 14. This output is applied to a NAND gate 16, together with an input pulse from clock A. The NAND gate 16 provides at its output a sync pulse which is used directly or after inversion in an inverter circuit 18 to perform a number of operations. One of these is to reset the first JK bistable of the synchroniser 10, thereby making it ready to receive the next pulse from the input line.

The sync pulse from the NAND gate 16 is applied directly to a four-bit counter 20, the function of which is to count the incoming pulses and to address a 16-word memory 22 in which each memory word consisting of two bits. The memory is preset with the 16 two-bit words, each word representing the limiting value of the corresponding pulse interval for recognition of the pulse train. As the count in the counter 20 increases, each of the 16 words is selected in turn and is applied to the two least significant stages of a four-stage parallel input count-down counter 24. The sync pulse at the output of inverter 18 causes the counter 24 to be loaded with the two-bit word from the memory 22, together with a "1" in its next most significant stage and a "0" in its most significant stage. The value "1" in the third stage represents the 4 microsecond minimum value of the intervals; then for a 4-microsecond interval the two least significant stages of the counter receive "00" from the memory, for a 5-microsecond interval they receive "01," for a 6-microsecond interval "10" and for a 7-microsecond interval "11." It will be realised that in the drawing the four-stage counter 24 is shown with its most significant digit at the right-hand end, so that these binary digits will be in reverse order in the two left-hand stages of the drawing.

Prior to the commencement of a pulse train, a bistable circuit 26 consisting of two cross-coupled NAND gates is in a condition in which it applies a "1" level to the J input of a control JK bistable circuit 28, the circuit 26 having been reset in the interval between pulse trains. As a consequence, when the first sync pulse clocks the bistable 28, the Q output of this circuit will go to the "1" level; at the same time, the sync pulse resets bistable 26 so that the "1" level on the J input of the control bistable 28 is removed. This situation remains (since when there is a zero level on the J and K inputs of the bistable, the output does not change when clock pulses arrive) until the K input is forced to a "1" level by the arrival of a non-recognition pulse, as will be described later.

Therefore during scanning a "1" level is applied from the Q output of the control bistable to NAND gates 30 and 36. The NAND gate 30 also receives clock B pulses, whch occur alternately with the clock A pulses, as shown in FIG. 3. The clock B pulses passed by the NAND gate output are applied through an inverter circuit 32 to the count-down counter 24.

Assuming that the count-down counter has been preloaded with a value of five, then in a 6-microsecond pulse interval, the fifth clock B pulse will result in the counter reaching the state 0000 and the subtraction of the next clock B pulse will change it to 1111. The appearance of a "1" in the most significant stage of the counter causes a "1" signal level to be applied to the K input of the control bistable 28. The next sync pulse then clocks bistable 28, forcing its Q output to the zero level and stopping the scan; the bistable 28 remains in this condition until the end of the pulse train, thereby preventing the application of further clock B pulses to the counter 24.

The "1" signal level from the most significant stage of the count-down counter 24 also goes to the D input of a recognition bistable 34. The output of the NAND gate 36, which also receives the sync pulses, is applied through an inverter 38 to the recognition bistable and interrogates the latter at each sync pulse after the first. Thus when the counter 24 goes negative, the bistable 34 is set by the next sync pulse to indicate non-recognition. Provided that this counter 24 does not go negative, the process continues, intervals being timed as described above until the last pulse of the train has gone.

The first pulse of each pulse train actuates a ten microsecond monostable circuit 40 which is unable to revert to its initial condition during the pulse train but reverts during the period between pulse trains. It then actuates a pulse-generating circuit 42 which provides a reset pulse, which resets the four-bit pulse counter 20, the cross-coupled bistable circuit 26, and the control bistable 28. The application of the reset pulse, through an inverter, to the cross-coupled bistable 26 results in the application of a "1" value to the J input of the control bistable 28.

In the above example, since there are four possible intervals and sixteen intervals in a pulse train, the number of possible signal states is $4^{16}$.

I claim:

1. Apparatus for receiving an incoming data signal in the form of a series of pulse signals defining a series of data values, comprising:

means for storing a reference series of data values;

comparator means connected to receive the series of pulse signals constituting the said incoming data signal, for measuring each data value, and including selector means responsive to the successive pulse signals of the incoming series for selecting each of the said stored reference data values in turn for comparison with corresponding ones of the series of measured data values, the comparator means generating a signal when a measured data value bears a predetermined one of the following relationship with the value of the corresponding one of the stored data values, namely (a) does not exceed, (b) exceeds, (c) is less than, (d) is not less than, the said stored value;

and means responsive to the successive signals generated by the comparator and operative to generate an output signal at the end of the incoming data signal when each of the said series of measured data values of the incoming data signal bears the same predetermined relationship with its corresponding stored data value.

2. Apparatus as defined in claim 1, for use with data signals in which the time intervals between successive pulse signals of the series constituting a data signal represent data values, the apparatus including timing means for timing each interval between successive pulse signals in turn, the comparator means comparing value of the duration of each timed interval between successive incoming pulse signals with the value represented by the corresponding one of the series of stored data values.

3. Apparatus as defined in claim 2, in which the timing means includes a clock pulse generator, a pulse counter and a control circuit through which the pulse counter is connected to receive clock pulses from the pulse generator, the control circuit being responsive to incoming pulse signals to enable the application of pulses from the clock pulse generator to the counter for the duration of the interval between a pair of successive pulse signals in the series constituting a data signal.

4. Apparatus as defined in claim 3, in which the selector means applies each of the said stored data values in turn to the counter, the apparatus further including means whereby the clock pulses applied to the counter cause the counter to count down from the data value extracted from store towards zero, and means responsive to the arrival of further clock pulses at the counter after the counter has reached zero and before the counter is reset to provide a signal indicative of a completed comparison of a data value.

5. Apparatus as defined in claim 4, in which the counter is a binary counter having one stage more than the maximum of binary stages in the predetermined stored interval values and is such that on receiving a further clock pulse after reaching zero assumes a filled condition, whereby the presence of a digit in the said additional stage causes the generation of the said signal.

6. Apparatus as defined in claim 4, including means responsive to the said signal to prevent the comparison of data values defined by the remaining pulse signals of an incoming data signal with the said stored data values.

7. Apparatus as defined in claim 2, responsive to a data signal in which any interval between successive series of pulse signals is greater than the interval represented by any value of the stored series, the apparatus further including means responsive to an interval greater than the all intervals between successive pulse signals in a series for generating a reset pulse.

8. Apparatus as defined in claim 2, including a pulse counter for counting incoming pulse signals of a series constituting a data signal, the selector means being actuated to address the store of data values in accordance with the count in the pulse counter.

* * * * *